United States Patent
Hoffman

(10) Patent No.: US 6,733,375 B2
(45) Date of Patent: May 11, 2004

(54) HORIZONTAL FINISHING MACHINE

(75) Inventor: Steve E. Hoffman, Englewood Cliffs, NJ (US)

(73) Assignee: Mikronite Technologies Group Inc., Carlstadt, NJ (US)

( * ) Notice: Subject to any disclaimer, the term of this patent is extended or adjusted under 35 U.S.C. 154(b) by 0 days.

(21) Appl. No.: 10/326,674

(22) Filed: Dec. 20, 2002

(65) Prior Publication Data

US 2003/0092367 A1 May 15, 2003

Related U.S. Application Data

(63) Continuation-in-part of application No. 09/965,270, filed on Sep. 27, 2001, which is a continuation-in-part of application No. 09/965,162, filed on Sep. 27, 2001.

(51) Int. Cl.⁷ ................................. B24B 31/00
(52) U.S. Cl. .................. 451/326; 451/328; 451/329
(58) Field of Search ..................... 451/32, 38, 326, 451/328, 329

(56) References Cited

U.S. PATENT DOCUMENTS

| | | |
|---|---|---|
| 1,146,269 A | 7/1915 | Mauss |
| 1,491,601 A * | 4/1924 | Fuller |
| 1,512,350 A | 10/1924 | McCorkle et al. |
| 1,538,231 A | 5/1925 | Abbott |
| 2,131,732 A | 10/1938 | Hammell |
| 2,204,039 A | 6/1940 | Francois |
| 2,550,630 A | 4/1951 | Whitehead |
| 3,013,365 A | 12/1961 | Harper |
| 3,201,273 A * | 8/1965 | Maker et al. |
| 3,233,372 A | 2/1966 | Kobayashi |
| 3,474,574 A | 10/1969 | Ohno |
| 3,503,157 A | 3/1970 | Harper |
| 3,513,604 A | 5/1970 | Matsunaga et al. |
| 3,823,512 A * | 7/1974 | Kobayashi |
| 4,021,971 A * | 5/1977 | McFadden |
| 4,073,095 A | 2/1978 | Dreher |
| 4,280,302 A | 7/1981 | Ohno |
| 4,580,371 A | 4/1986 | Akhavi |
| 4,586,292 A | 5/1986 | Carroll et al. |
| 4,967,514 A | 11/1990 | Kunz |
| 5,140,783 A | 8/1992 | Hoffman |
| 5,295,330 A | 3/1994 | Hoffman |
| 5,355,638 A | 10/1994 | Hoffman |
| 5,454,749 A | 10/1995 | Ohno |
| 5,507,685 A | 4/1996 | Hoffman |
| 5,672,094 A * | 9/1997 | Nishimura et al. |
| 5,848,929 A | 12/1998 | Hoffman |
| 6,367,134 B1 * | 4/2002 | Sanada et al. ............. 29/25.42 |

* cited by examiner

Primary Examiner—Eileen P. Morgan
(74) Attorney, Agent, or Firm—Drinker Biddle & Reath LLP

(57) ABSTRACT

A horizontal centrifugal finisher is disclosed for subjecting a product to centrifugal and rotational motion. The finisher includes a main frame which rotationally supports a central shaft about a horizontal longitudinal axis. At least two radial supports are mounted to and extend radially outward from the shaft. One or more containers are rotatably supported by the radial supports. Each container has two side walls, two end walls, a bottom and an open top. The walls and the bottom define an enclosure for containing products to be finished. A cover is attached to the container for closing off the open top. A drive system is incorporated into the finisher for rotating the containers. The drive system includes a primary drive system adapted to rotate the shaft about its horizontal axis, and a secondary drive system adapted to rotate the containers about their respective longitudinal axis.

27 Claims, 12 Drawing Sheets

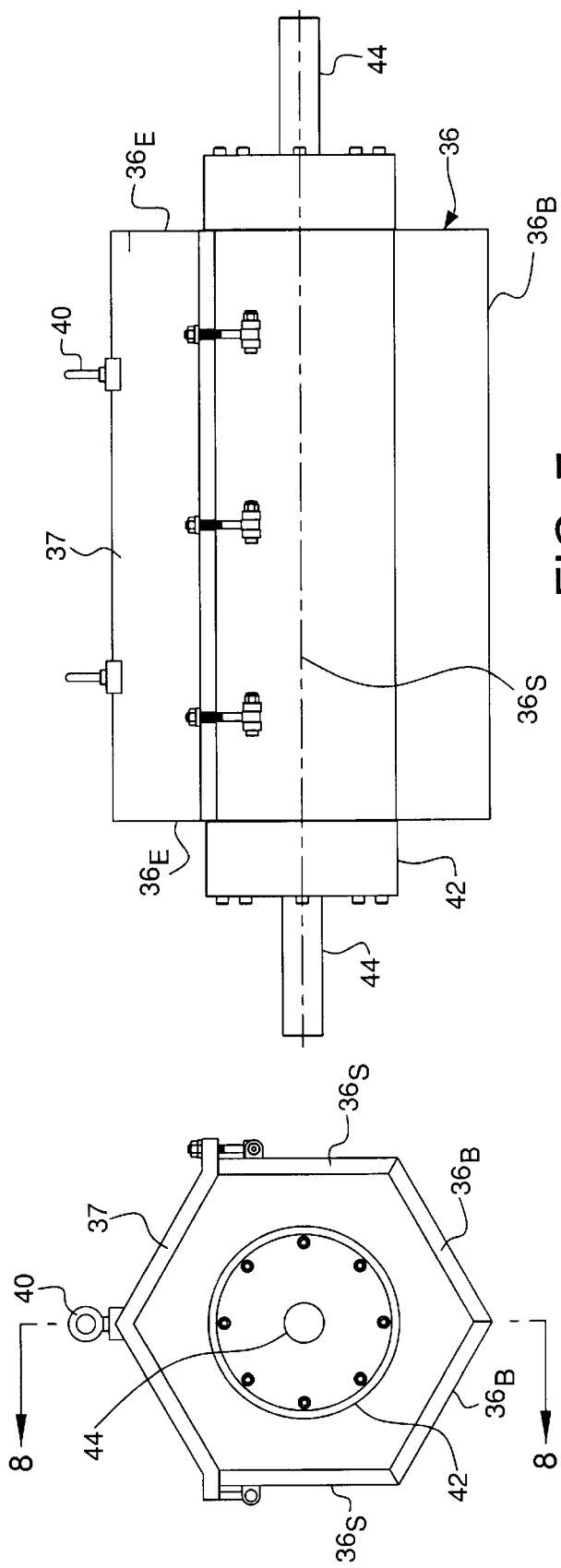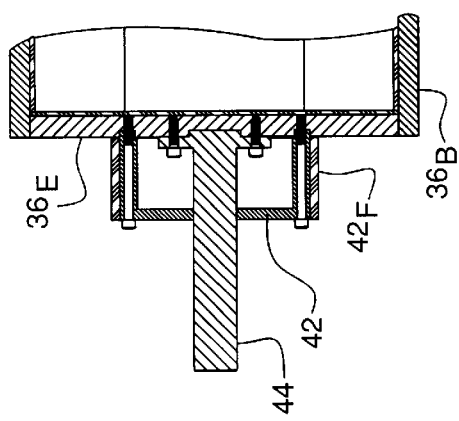
FIG. 7
FIG. 8
FIG. 6

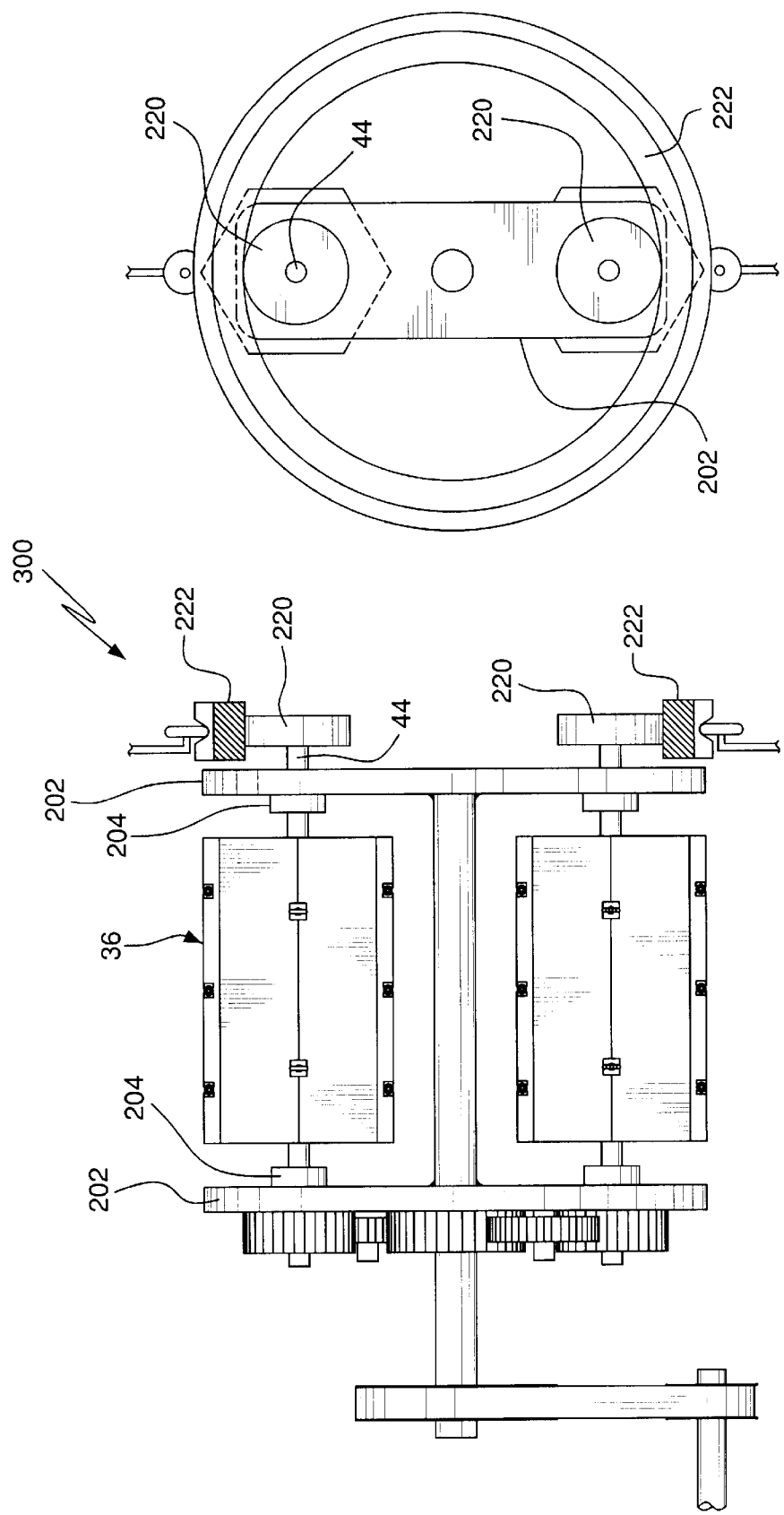

HORIZONTAL FINISHING MACHINE

RELATED APPLICATIONS

The present application is a continuation-in-part of application Ser. No. 09/965,270, entitled "High Speed Centrifugal Processor," filed Sep. 27, 2001, and application Ser. No. 09/965,162, entitled "Saw Blade," filed Sep. 27, 2001. The entire disclosures of both applications are incorporated herein by reference in their entirety.

FIELD OF THE INVENTION

The present invention relates to an apparatus for providing material processing, including finishing, of an article through high speed and high energy centrifugal and rotational motion.

BACKGROUND OF THE INVENTION

There has been a tremendous appreciation in recent years for the benefits and importance of surface finishing of a manufactured product. For many products it is desirable, and in some cases necessary, that the products be finished so as to have a smooth surface, without any reduction in the material characteristics of the product which may be essential for product's intended purpose.

Various processes have been developed over the years to provide such surface finishing. Some finishing machinery use the centrifugal force imparted by a rotating vessel to finish products. A number of these machines subject objects to both centrifugal and rotational forces using a complex gearing arrangement. These types of machines are limited to a particular ratio of revolutional speed to rotational speed. Also, the construction of these existing machines is complicated requiring many moving parts, and are generally extremely noisy. Other types of machines create centrifugal forces by revolving a vessel around a shaft and creating rotational forces using a belt wrapped around the shaft and the exterior of the vessel. The speed of the belt is related to the speed of the shaft. Overheating is common in these types of machines.

One successful machine using both centrifugal and rotational forces in a simple design, without a system of gears and which can be operated at very high speeds, is disclosed in U.S. Pat. No. 5,355,638 to Hoffman, the disclosure of which is hereby incorporated by reference in its entirety. As disclosed in that '638 patent, the centrifugal vertical finisher (or polisher) has an outer vessel that is rotatable, and at least one inner vessel that is revolved about the axis of the rotatable outer vessel and rotated about its own axis. A traction surface exists between the inner surface of the outer vessel and the outer surface of the inner vessel. The traction surface allows the outer vessel to restrain the inner vessel while the inner vessel experiences centrifugal forces. This machine simultaneously uses the momentum caused by the speed and potentially direction differential between the outer and inner vessels to produce revolution of the inner vessel.

The '638 patent also discloses an apparatus where a center drive can be used for rotating the outer vessel and the inner vessel.

Another successful machine using both centrifugal and rotational forces is disclosed in U.S. Pat. No. 5,848,929 to Hoffman, the disclosure of which is hereby incorporated by reference in its entirety. The '929 patent discloses a centrifugal vertical finisher with a fixed outer vessel that permits much larger objects to be finished without the need to apply excessive energy and force to the unit. Additionally, the device in the '929 patent permits the inner vessel to be removed so that vessels of various diameters can be used in the unit without necessarily having to change the outer vessel.

While the finishing machines shown in the '638 and '929 patents were a tremendous advance over the then existing machines, they were limited in that products to be finished must be loaded and unloaded vertically. Thus, the configuration limits the size and number of products to be processed at a time. Also, because of the vertical orientation of the containers, some finished products tend to migrate toward the bottom of the container after finishing, requiring the container to be emptied by dumping out the contents. Furthermore, gravitational and centrifugal forces urge the media to tend to disperse in a less than isotropic manner.

A need, therefore, exists for an improved high speed centrifugal finisher which permits easy access to the contents within the finishing containers.

SUMMARY OF THE INVENTION

A horizontal centrifugal finisher is disclosed for subjecting a product to centrifugal and rotational motion. The finisher includes a main frame which rotationally supports a central shaft. The central shaft having a horizontal longitudinal axis about which it rotates. At least two radial supports are mounted to and extend radially outward from the shaft.

One or more containers are rotatably supported by the radial supports. Each container has two side walls, two end walls, a bottom and an open top. The combination of the walls and the bottom define an enclosure for containing products to be finished. A cover is attached to the container for closing off the open top. The container includes rods extending laterally outward from each end wall. The rods extend into and are supported by bearings in the radial arms. The bearings permit each container to rotate about its rotational axis.

A drive system is incorporated into the finisher for rotating the containers. The drive system includes a motor and a primary drive system. The primary drive system connects the motor to the central shaft, and is adapted to rotate the shaft about its horizontal axis, thereby causing the containers to rotate about the horizontal axis. A secondary drive system connects the motor to the containers, and is adapted to rotate the containers about their respective longitudinal axis.

In one embodiment of the invention, the secondary drive system is connected to the motor through the central shaft and is connected to the containers through an outer housing having a cylindrical inner surface. The containers include a follower mounted to each container which contacts and rolls along the cylindrical inner surface. The rolling along on the cylindrical inner surface causing the container to rotate about its longitudinal axis.

The housing is preferably a cylindrical ring which is supported by a frame. In one embodiment of the invention, there are two cylindrical rings, one on each side of the container.

In another embodiment of the invention, the secondary drive system includes a set of timing gears which are engage with the central shaft and which rotate the containers at a speed relative to the speed of the central shaft.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

FIG. 4 is a front view of the radial arm of FIG. 4.

FIG. 6 is a side view of one embodiment of a container for use in the present invention.

FIG. 7 is a side view of the container of FIG. 6.

FIG. 8 is a partial section view of the container taken along lines 8—8 in FIG. 6.

FIG. 16 is a front view of a variation of the third embodiment.

FIG. 17 is a side view of the embodiment of the invention shown in FIG. 16.

DETAILED DESCRIPTION OF THE PREFERRED EMBODIMENTS

Figure 1:
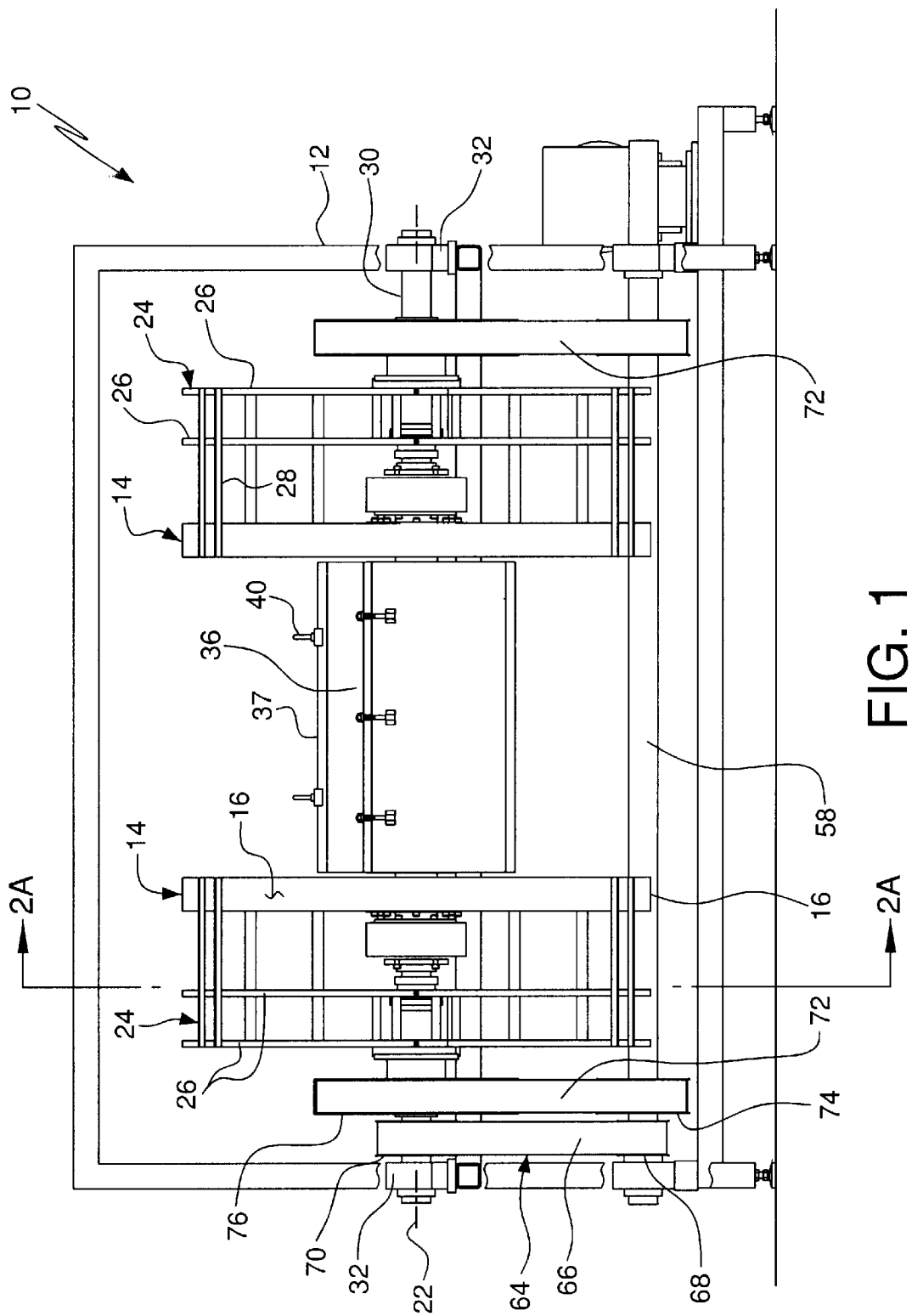
FIG. 1 is a front view of a horizontal finishing machine according to one embodiment of the invention.
Figure 2:
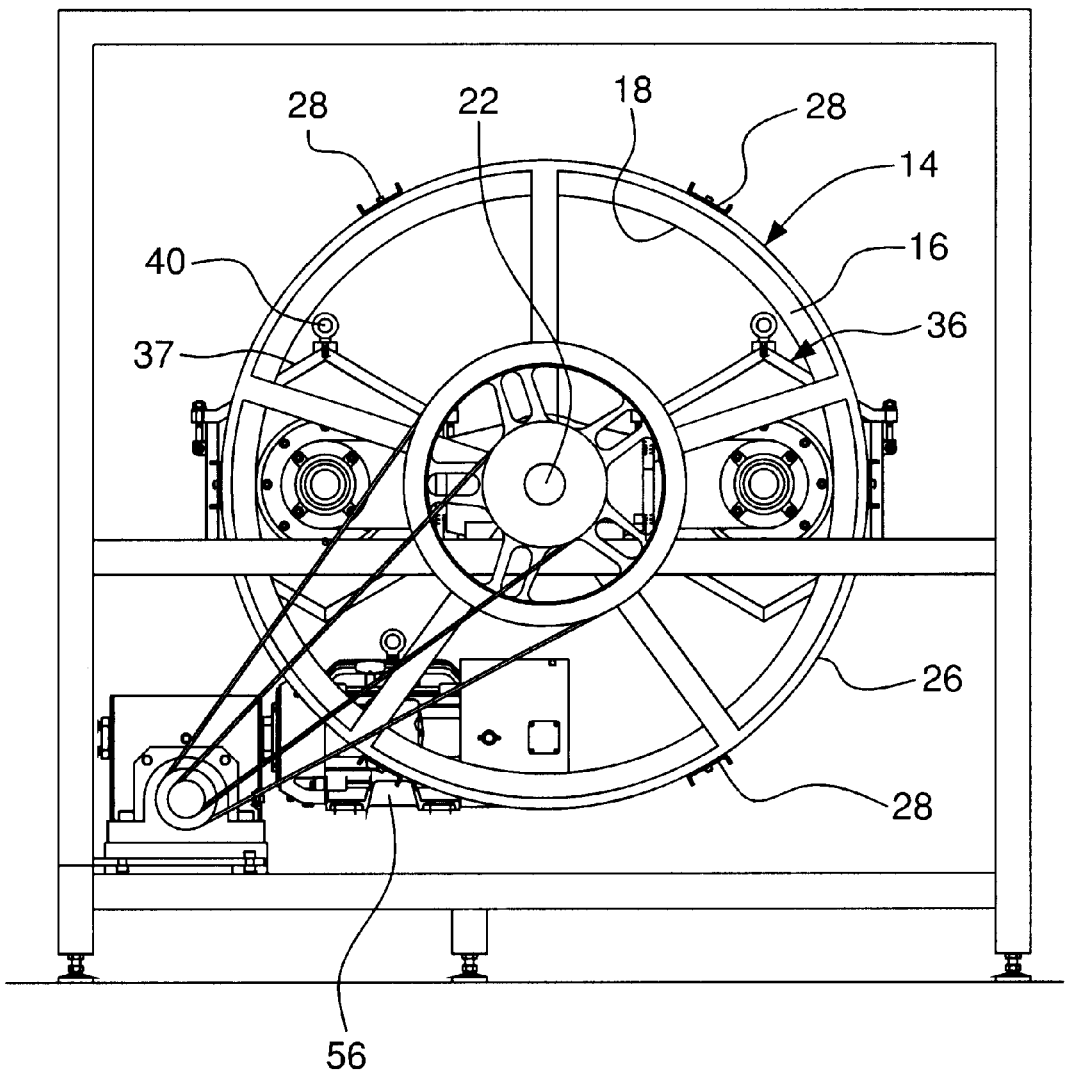
FIG. 2 is a side view of the horizontal finishing machine of FIG. 1.
Figure 2A:
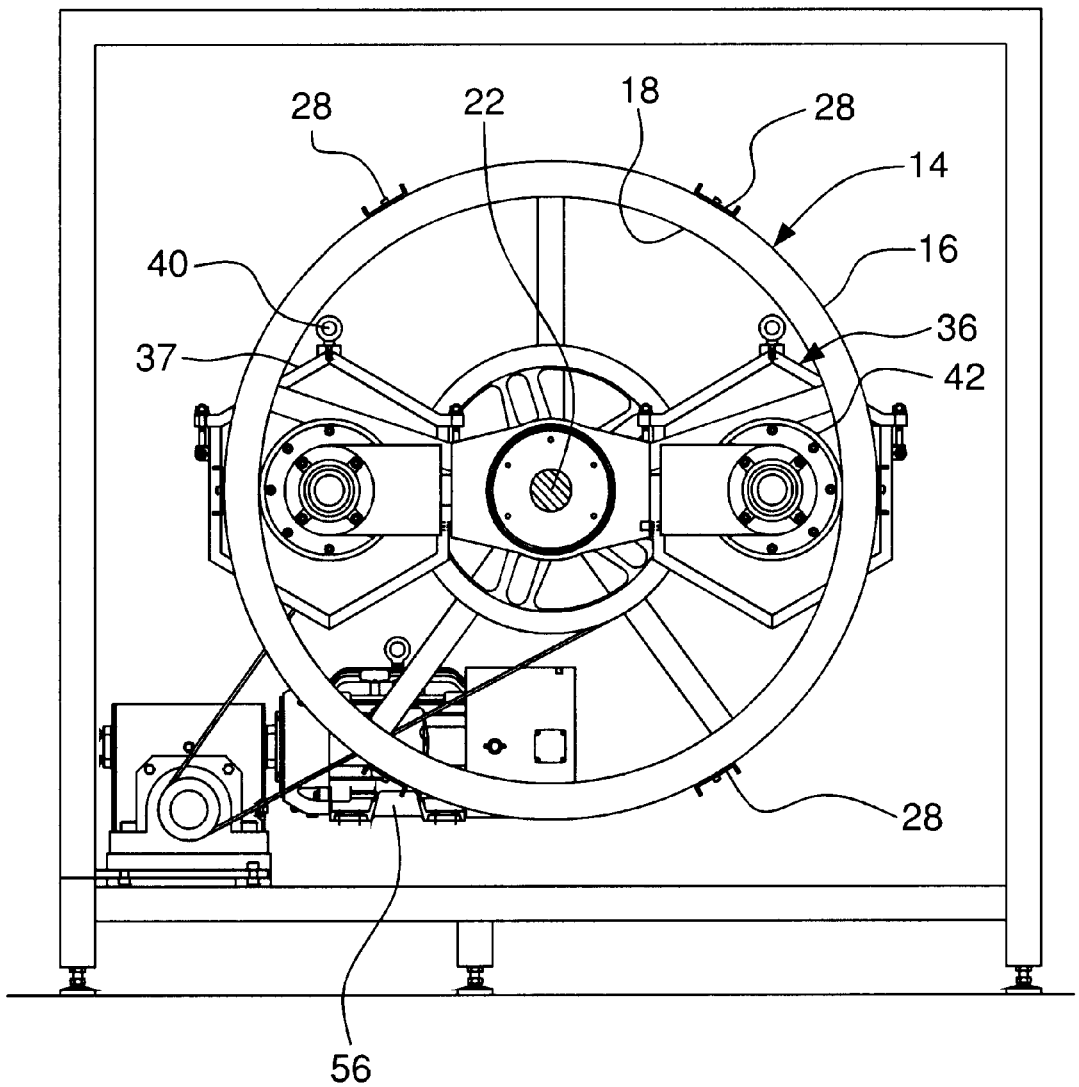
FIG. 2A is a section view of the horizontal finishing machine taken along lines 2A—2A in FIG. 1.
Figure 3:
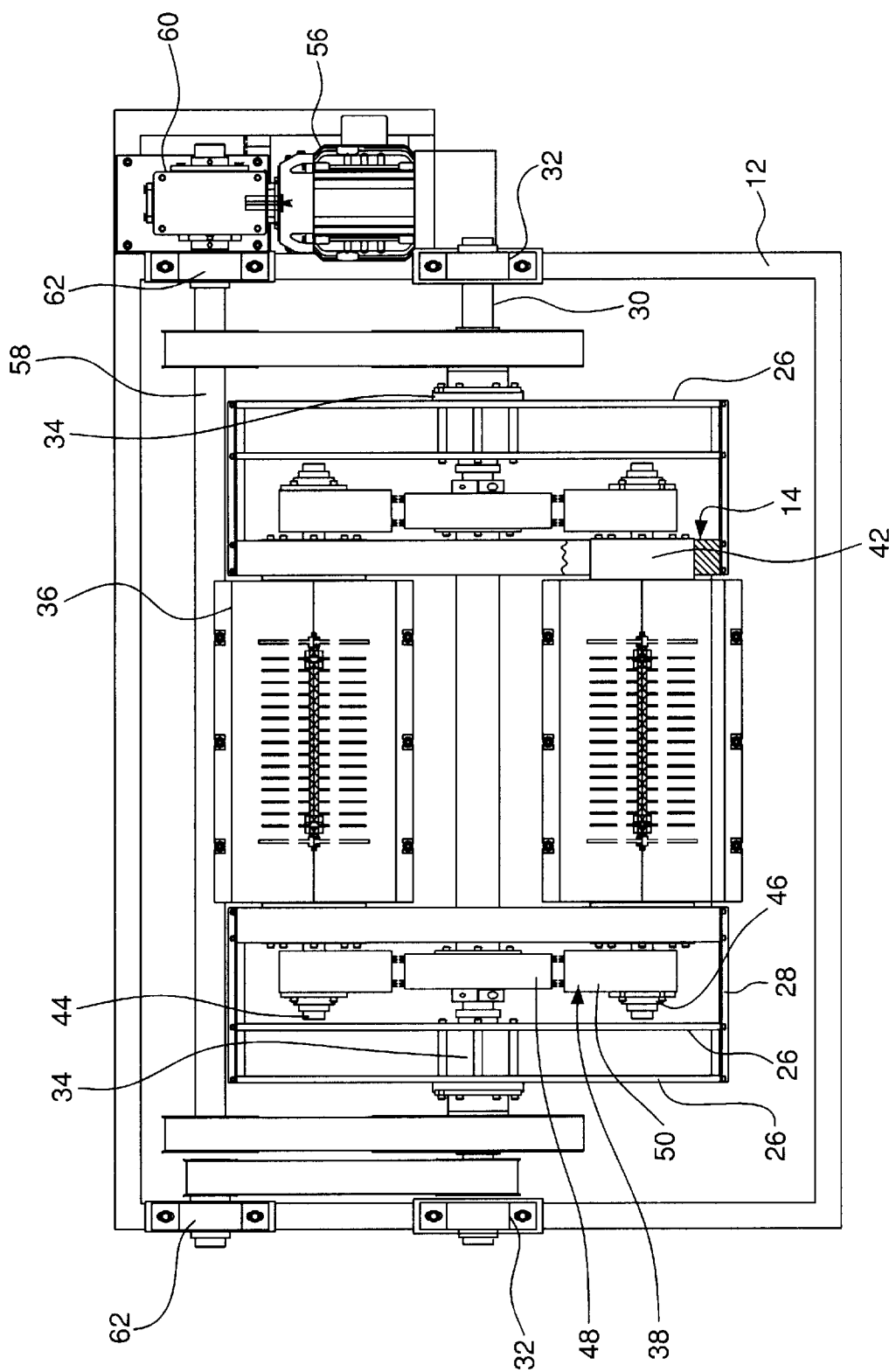
FIG. 3 is a top view of the horizontal finishing machine of FIG. 1.
Figure 4:
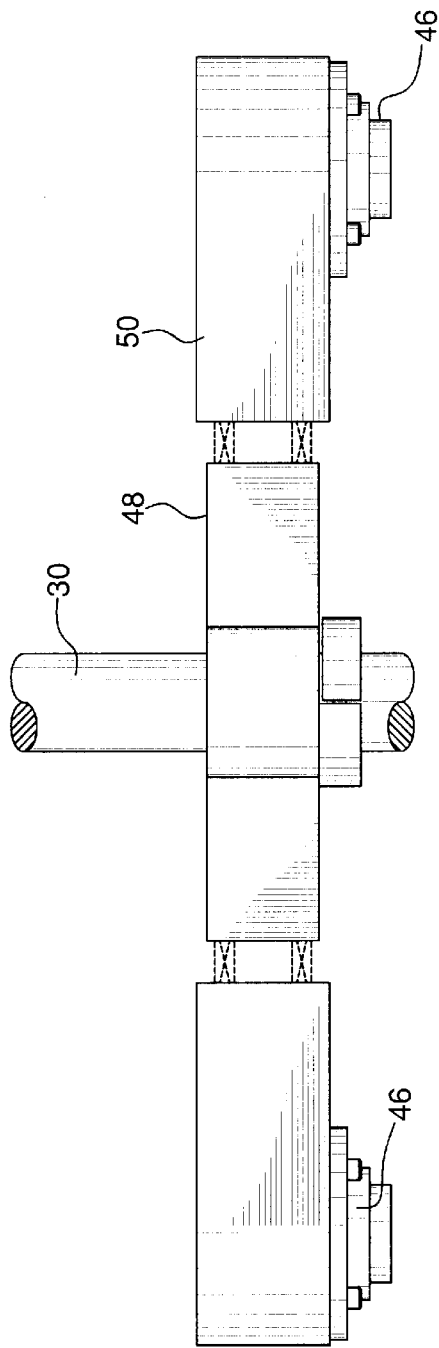
FIG. 4 is a top view of a radial arm used in the present invention.
Figure 5:
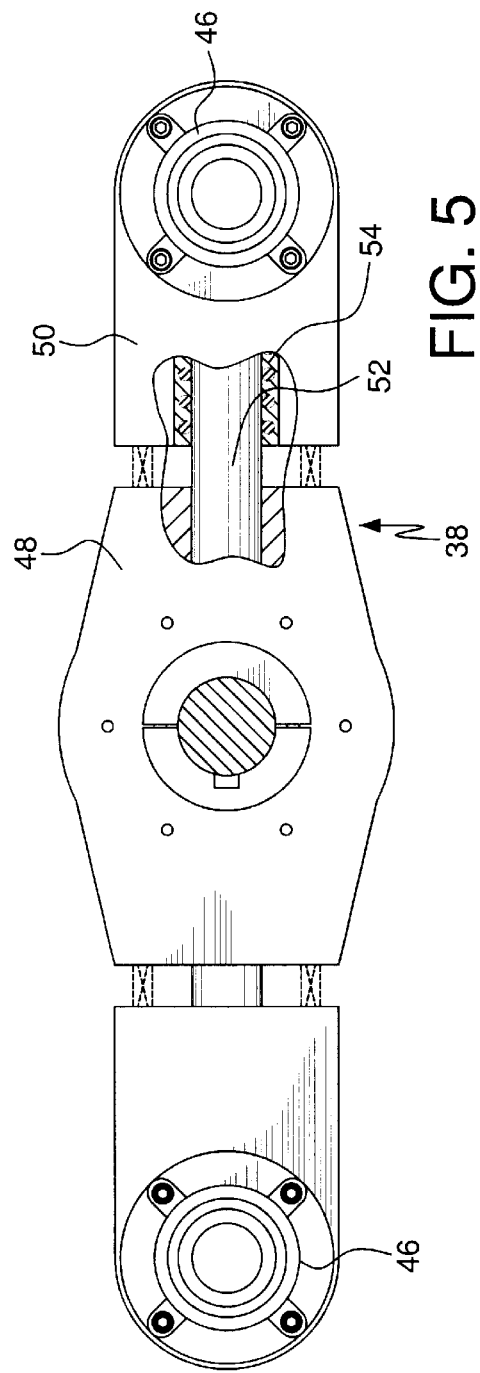

Referring now to the drawings, wherein like reference numerals illustrate corresponding or similar elements throughout the several views, FIGS. 1–3 are front, side and top views, respectively, of a first embodiment of a horizontal centrifugal processor 10 according to the present invention for use in processing, including finishing, products through the application of centrifugal and rotational motion. For the purposes of simplicity, unless stated otherwise herein, the terms "processing" and "finishing" are used interchangeably in this application to refer to an operation performed on the surface of a workpiece, whether the operation is the final step performed on the piece or an intermediate step. Similarly, the terms "processor" and "finisher" refer to a machine with performs an operation on the surface of a workpiece.

The finisher 10 includes a main frame 12 which supports the various components of the finisher. The finisher 10 also includes a first support 14, which is preferably in the shape of an annular ring. The first support 14 includes an outer surface 16 and an inner surface 18. The inner surface 18 is preferably substantially cylindrical in shape as will become more apparent hereinafter. The support 14 also has a central axis which is oriented so as to define a substantially horizontal axis 22.

In the illustrated embodiment, there are preferably two annular ring supports 14 horizontally spaced apart from one another. The central axes of the two supports are preferably co-linear with one another, thereby defining a horizontal axis 22 therebetween. The ring supports 14 are also preferably formed from a high strength material, such as steel. In one embodiment of the invention, the ring support 14 has an inside diameter of approximately 52 inches and an outside diameter of approximately 56 inches.

A frame 24 is mounted to each ring support 14. Each frame 24 includes at least one, and more preferably two spaced apart plates 26. The plates may be formed with radial spokes for lightening the weight of the overall frame structure. The plates 26 are mounted to the ring support 14 through a plurality of lateral stiffeners 28. The lateral stiffeners 28 are attached to and spaced circumferentially about the frame 24 and ring support 14. Alternatively, the lateral stiffeners could be rods or bolts which attach and space the frame and ring. The combination of the plates 26 and stiffeners 28 provides a strong support frame 24 for preventing or limiting deformation, such as bending, of each ring support 14. The frame 24 also provides a convenient mechanism for transferring rotational motion to the ring support 14. As will be discussed below, it is anticipated that the frame 24 is configured to rotate in combination with the ring support 14.

The rings 14 are mounted through the frame 24 to a central shaft 30, which has a longitudinal axis that lies along the horizontal axis 22. The central shaft 30 preferably extends axially past the rings 14 and is attached to the main frame 12. More specifically, the ends of the central shaft 30 extend through bearing supports 32 which are attached to the frame 12. The bearing supports 32 permit the central shaft to rotate about the horizontal axis 22. The shaft 30 is preferably made from a high strength metal, such as steel, so as to minimize bending of the shaft during operation. In one embodiment of the invention, the shaft 30 has an outside diameter of approximately 3.5 inches.

In the illustrated embodiment, the ring supports 14 are preferably mounted so as to be capable of rotating relative to the central shaft 30. More particularly, the plates 26 preferably have bearings 34 mounted on them through which the central shaft 30 passes. The bearings 34 permit the central shaft 30 to support the plates while, at the same time, permitting the plates 26 and the shaft 30 to move relative to one another.

Referring to FIGS. 1, and 6–8, at least one container or vessel 36 is used in the finisher for holding products to be finished. The container includes two side walls $36_S$, two end walls $36_E$, a bottom $36_B$, and an open top $36_T$. The walls and bottom combine to define an enclosure or cavity for receiving products to be finished. A cover 37 is movably attached to the container 36, preferably through a hinged connection, so as to permit access to and sealing of the open top. This arrangement permits products that are to be finished to be easily placed within the container. One or more actuators (not shown) may be mounted to a container wall for assisting in the lifting of the cover 37 and for holding the cover in the open position to permit product and media to be added and removed as needed. In one variation of the invention, the cover 37 is attached to the container with clamps. In this embodiment, the cover may include eye hooks 40 which permit the container cover to be lifted off using a winch assembly (not shown). Depending on the anticipated use for the machine, the container can be made of many different types of material and in varying thicknesses. For example, the container could be made of steel or aluminum material with a wall thickness of anywhere from ⅛ inch sheet metal to 1.5 inch plate. Due to the high anticipated loads in a machine used to finish the surface of saw blades, the container 36 is preferably made of high strength material, such as steel, with the walls having a thickness of approximately 1.5 inches. A urethane coating may be added to the interior surface of the walls.

The container 36 includes at least one, and more preferably two wheels or cam surfaces 42 (referred to generically as "wheels") which are mounted to the container end walls $36_E$, outside the container enclosure. The wheels 42 are preferably rigidly secured to the end wall $36_E$ such that the container 36 and wheels 42 are capable of rotating together as will become more apparent below. In the illustrated embodiment, each wheel 42 is bolted to an end wall $36_E$. While the illustrated embodiment in FIG. 2 shows the wheel 42 directly against the end wall $36_E$, it is also contemplated that the wheel could be spaced apart from the wall by a bracket or support rod.

The wheels 42 preferably have a friction or traction surface/layer $42_F$ formed on its outer periphery. As will be discussed in more detail below, the friction surface $42_F$ is useful in assisting in the rotation of the container 36. In one embodiment, the friction surface $42_F$ is a layer of urethane material. Alternatively, the entire wheel 42 could be made from a friction material, such as urethane. In the illustrated embodiment, the wheel 42 has an outer diameter of approximately 10 inches. The thickness of the urethane will vary depending on the anticipated loading. Preferably the thickness is between approximately 3/16 inches to approximately ¾ inches.

The container 36 is supported by the central shaft 30. More specifically, a radial arm 38 is mounted to the central shaft 30, preferably through a fixed mounting bracket. The fixed attachment results in the radial arm 38 rotating in combination with the central shaft 30. The radially outward end of the radial arm 38 is connected to the container 36 such that the container 36 can rotate relative to the central shaft 30. In the embodiment illustrated in FIGS. 2–5, the connection includes a support rod 44 which is fixedly mounted to the container 36. The outer radial end of the arm 38 includes a bearing 46, through which the rod 44 extends. The rod 44, and thus the container 36, are supported by the bearing 46 which also permits the rod 44 (and container 36) to rotate with respect to the arm 38. Any suitable bearing can be used. In one embodiment, the rod 44 is made from solid steel with an outer diameter of approximately 2.5 inches. It is also contemplated that the rod can be fixed to the arm 38 and the container 36, instead, includes a bearing attached to the end wall in which the rod 44 can rotate.

As shown in the figures, there are preferably two radial arms supporting each container 36. One radial arm located adjacent to each end of the container. The arms 38 are mounted to the central shaft 30 so as to position the wheels 42 of the container 36 adjacent to or near the inner surface 18 of the ring support 14. More specifically, the wheels 42 are located such that, during operation, the wheels 42 contact the inner surface 18 of the ring support 14. As will be discussed below, this results in the wheels (and containers) rotating about their axes as the central shaft 30 and arms 38 carry the container 36 around the horizontal axis. Thus, the rotation of the shaft 30 imparts centrifugal and rotational motion to the components located within the container 36.

The contact between the wheels 42 and the inner surface 18 of the ring supports 14 causes the wheels 42 to roll along the inner surface 18. Since the wheels 42 are fixed to the container 36, the rolling of the wheels 42 causes the container to rotate about a horizontal axis extending between the two wheels 42. This motion subjects the components located within the container to rotational motion. The friction surface $42_F$ assists in the rolling of the wheels along the inner surface 18. Thus, the ring support 14 functions as an outer race.

In one preferred embodiment, the arm 38 includes a fixed portion 48 and a movable or slidable portion 50. The fixed portion 48 is mounted to the central shaft 30. The slidable portion 50 is mounted to the container 36. The slidable portion 50 is attached to the fixed portion 48 through a shaft 52 and linear bearing 54 combination. Springs 56 or similar biasing devices may be used to bias the slidable portion 50 toward the fixed portion. The benefit of this embodiment is as follows. Prior to operation, the springs 56 bias the wheels 42 out of contact with the inner surface of the ring support 14. As such, when the finisher 10 is not operational, the containers 36 can be freely rotated, thus facilitating access to the cavity inside the container. When the finisher 10 is turned on and begins to rotate the central shaft 30, centrifugal forces act on the container and slidable portion. Once the speed of rotation passes a certain threshold, the centrifugal forces will be greater than the spring force, thus overcoming the biasing and allowing the slidable portion to slide radially outward. This sliding movement urges the wheels into contact with the inner surface 18, thus allowing the wheels to begin to roll the container 36. At this point, substantially all of the loading produced by rotating the container 36 is carried by the ring support 14.

In order to rotate the central shaft 30, the present invention uses a drive system that includes a motor 56 which rotates a drive shaft 58. Any suitable motor can be used in the present invention. In one embodiment, an AC motor is used which is capable of rotating at between approximately 1400 and 1800 RPM. In the illustrated embodiment, a gear reducer 60 is located between the output of the motor 56 and the drive shaft 58. The drive shaft 58 is connected to the gear reducer 60 in a conventional manner. The drive shaft 58 is supported by bearings 62, which permit the drive shaft 58 to rotate in place.

The drive system also includes means for transmitting torsion from the drive shaft 58 to the central shaft 30. There are a variety of means that can be used, such as a belt drive, gear train, chain drive, etc. In the embodiment shown in FIGS. 1–3, a belt drive system 64 is used. Any conventional belt drive system may be used with the present invention. The belt drive system includes a belt 66 disposed about a drive pulley (i.e., set of drive sheaves) 68 mounted to the drive shaft 58 and a driven pulley (i.e., set of driven sheaves) 70 mounted to the central shaft 30. The belt drive transmits rotation from the drive shaft 58 to the central shaft 30.

The present invention also contemplates a secondary drive system, in one preferred embodiment, for driving the ring support 14. As discussed above, the wheels of the containers 36 roll around the inside surface 18 of the ring support 14, thus subjecting the internal components and media to rotation. To induce further motion of the media within the container, the present invention permits the ring support 14 to be rotated with respect to the central shaft 30. The rotation can be in the opposite direction of the central shaft 30 or, more preferably, is in the same direction.

The secondary drive system uses the drive shaft 58 for providing the rotational input. A secondary belt 72 is disposed about a secondary drive pulley 74 and a secondary driven pulley 76. The secondary driven pulley 76 is preferably mounted to the frame 24. More specifically, in the embodiment of the invention shown in FIGS. 1–3, the secondary driven pulley is bolted to a mounting bracket on one of the plates 26 at the location of the bearing 34. This mounting arrangement permits the secondary driven pulley 76 to rotate the frame 24 and, thus, the ring support 14, about the horizontal axis 22. As shown, there are preferably two driven and drive pulleys in the secondary drive system. Those skilled in the art would readily appreciate that the secondary drive system can be arranged in various other configurations, such as with a gear train, in light of the teachings provided herein.

The diameters of the primary and secondary drive and driven pulleys, as well as the diameters of the wheel 42 and the inner surface 18 define the relative speed between the container 36 and the ring support 14. Preferably, the ratio in the speed between the container 36 and the ring support 14 is such that the ring support 14 rotates at between approximately 50% and 80%, and more preferably between approximately 70% and 75%, of the speed of the central shaft. This speed differential provides even, isotropic movement of the media within the containers. Different speeds result in different amounts of finishing. Also, by changing the size of the wheel 42, the amount of material being removed can be adjusted. For example, the amount of material removed can be varied by increasing the ratio of the number of times the container rotates about its axis during one rotation about he central axis from 2.5:1 to 3:1, or by stopping the rotation of the ring support relative to the center shaft (which results in a change to 6:1), depending on need.

Also it has been determined that the ratio of the radius of outer ring relative to the radius of the container from the central axis should be between approximately 1.2:1 to approximately 1.75:1. More preferably the ratio should be approximately 1.41

One of the benefits to the arrangement described above is that the system can be readily modified to allow for independent control of the speed of the container 36 and the ring support 14. That is, either of these components could be driven faster, slower, or not at all relative to the speed of the other component, thereby varying the media movement inside the container 36. By controlling the movement of the media in this manner, the amount of work (abrasive processing) performed on product being processed can be varied. The control can be in stages, or can be performed simultaneously during operation (e.g., changing from a course finishing operation to a fine finishing operation, or from isotropic movement of the media to a more chaotic movement resulting in a lapping or shopping of the media across the face of the product being finished.)

Figure 9:
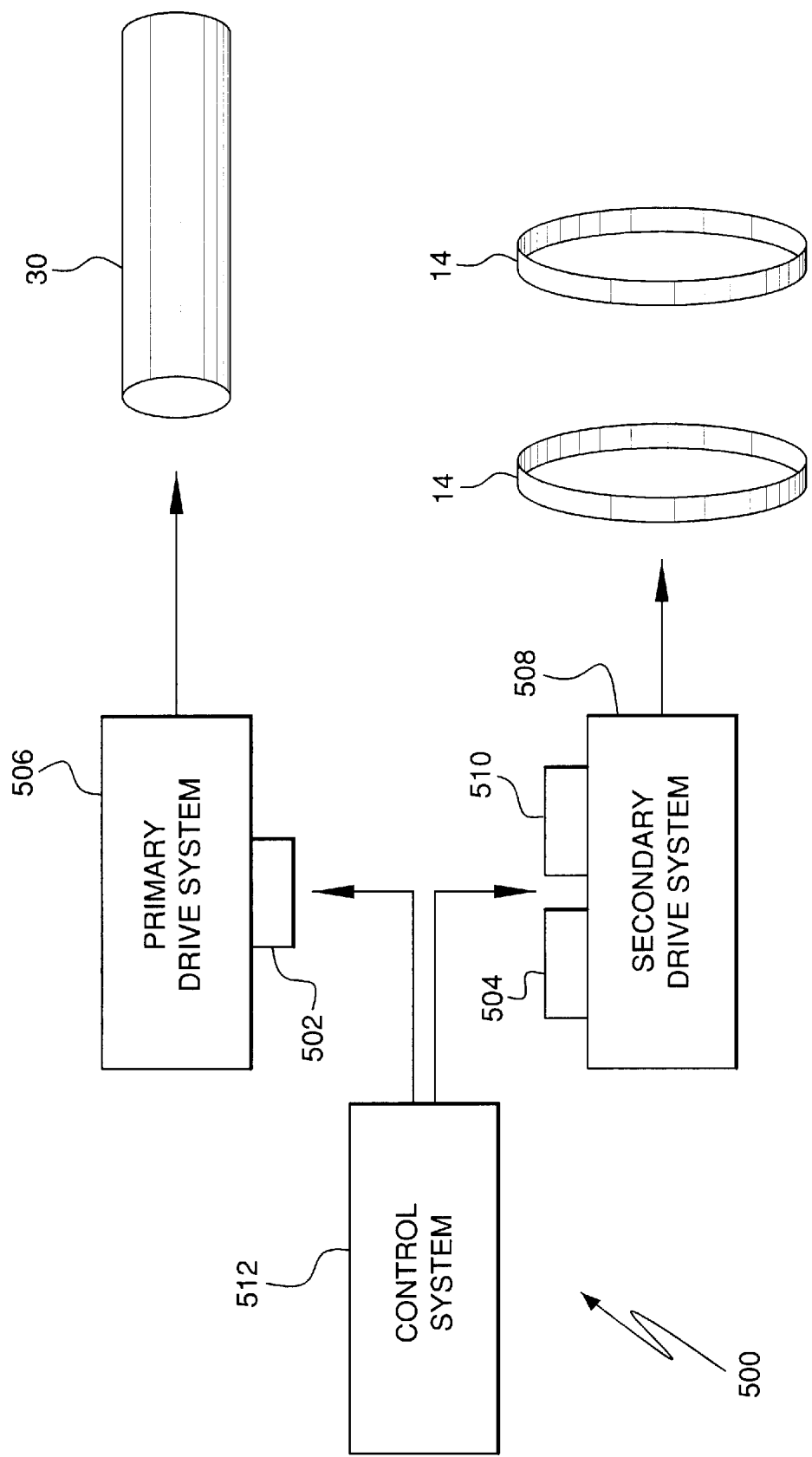
FIG. 9 is a schematic representation of the control system for use with the various embodiments of the present invention.
Figure 10:
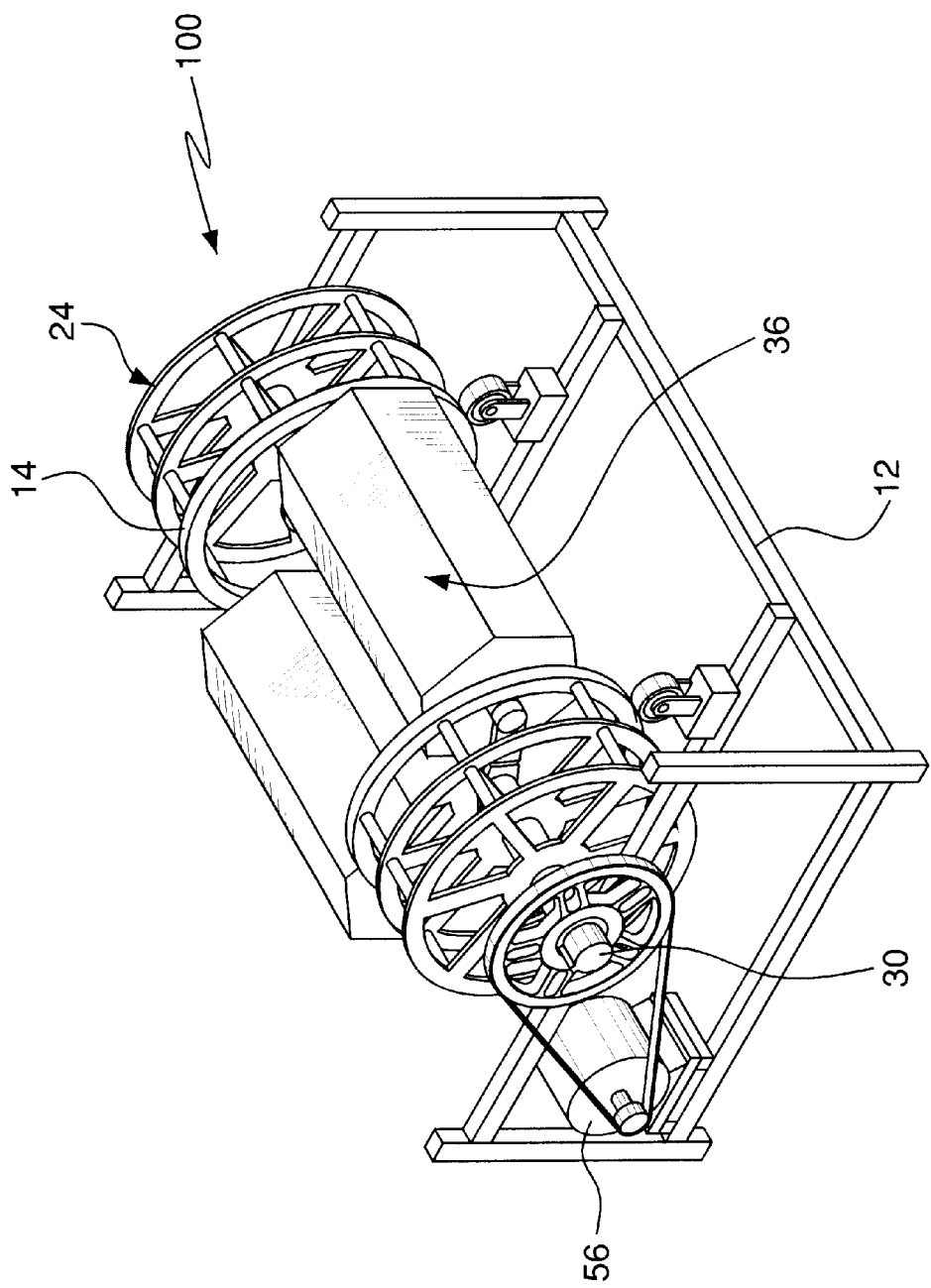
FIG. 10 is an isometric view of a second embodiment of the invention.
Figure 11:
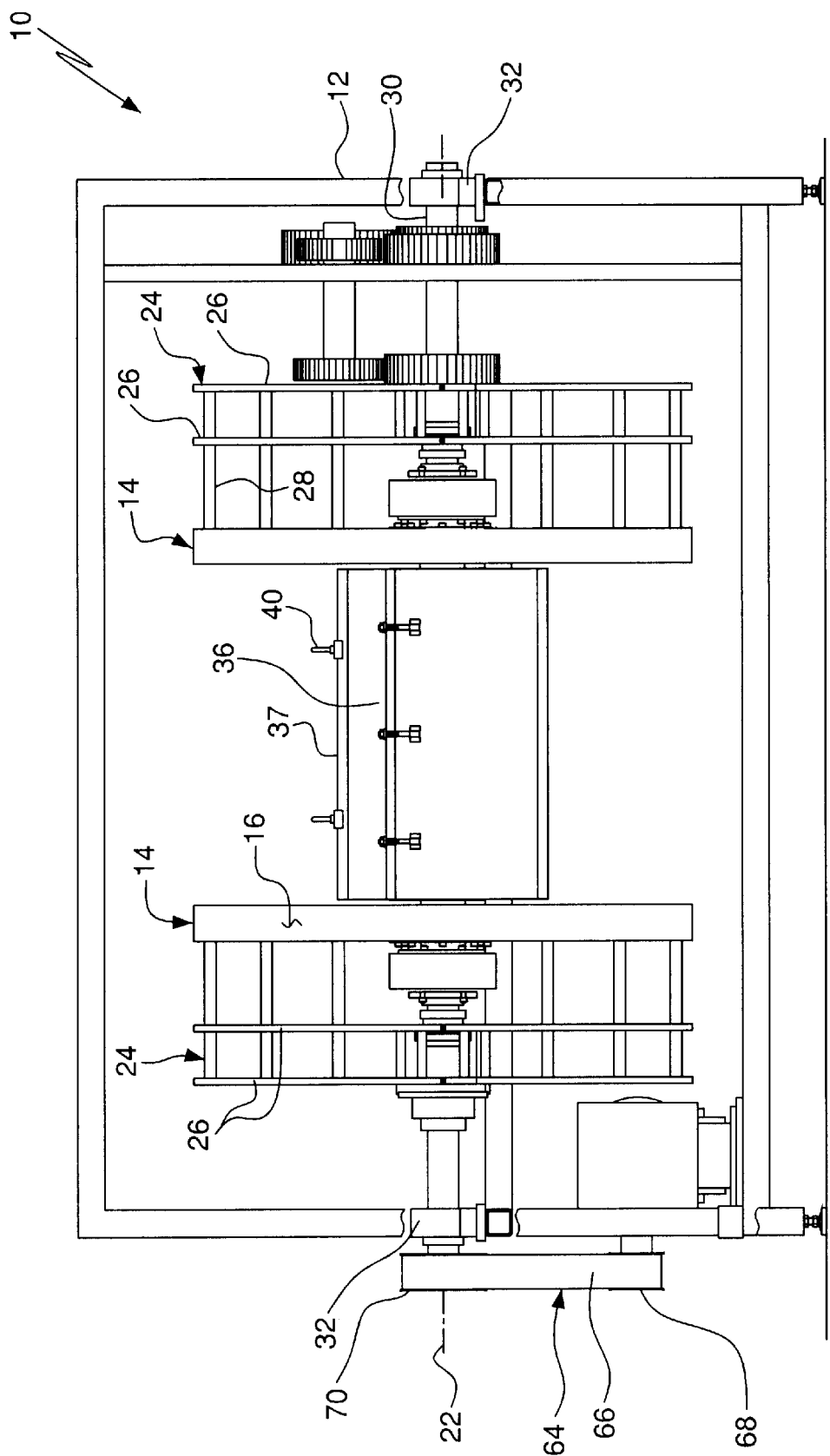
FIG. 11 is a front view of the embodiment of the invention of FIG. 10.
Figure 12:
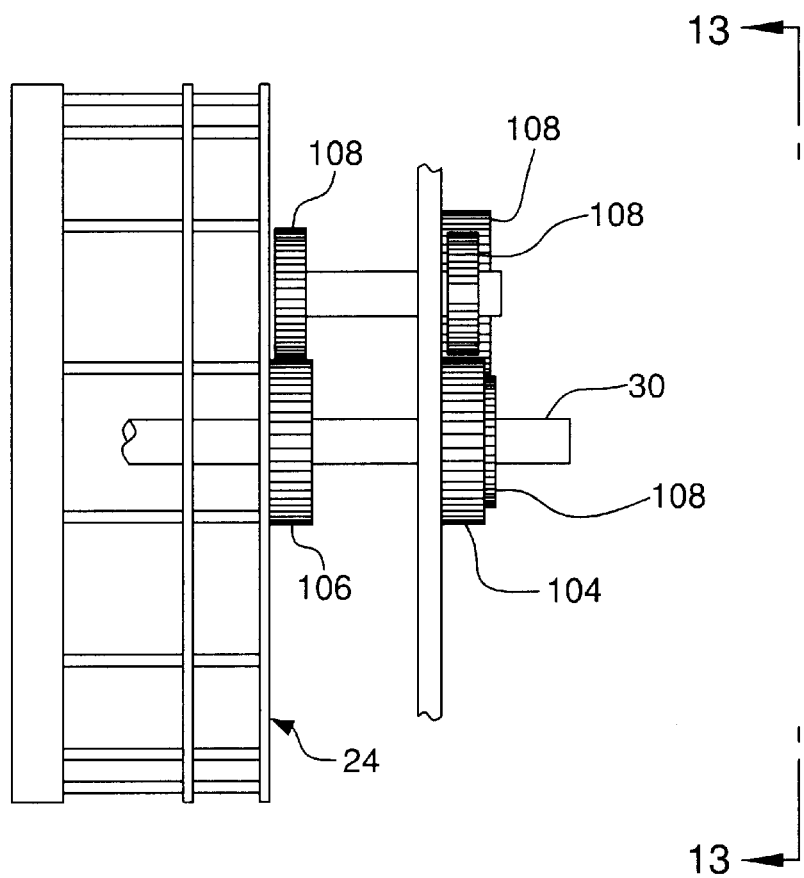
FIG. 12 is a partial front view of the secondary drive system of the embodiment of the invention shown in FIG. 11.
Figure 13:
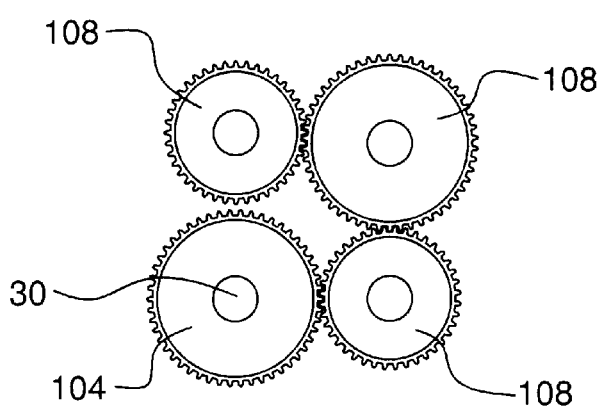
FIG. 13 is a side view of a portion of the secondary drive system taken along lines 13—13 in FIG. 12.

In order to provide such control, a control system 500 is incorporated into the primary and secondary drive systems. A schematic of the control system is shown in FIG. 9. The control system 500 includes clutches or similar components 502, 504, which control the engagement and disengagement of the primary and secondary drive systems 506, 508. The control system 500 also includes a variable transmission 510, such as a gearbox or constant velocity transmission, which is used to control the relative speeds of the central shaft and the ring support. A controller 512, such as a digital computer or microprocessor, is used to control the various components of the control system. It is contemplated that a variety of different processing regimes would be stored in the computer, thereby permitting programmed, automated operation of the system.

As shown in FIGS. 2 and 3, there are preferably two containers 36 mounted to the central shaft 30 on diametrically extending arms 38. This arrangement is useful for containers which have a relatively large size. In the illustrated embodiment, the containers 36 are hexagonal in shape and sized to receive a fixture containing a plurality of saw blades having a diameter of up to approximately 15 inches. In an alternate embodiment (not shown), smaller containers 36 may be used, thus permitting the mounting of four or more containers onto the shaft. The containers are preferably mounted equidistant from one another (e.g., 90 degrees from one another). Two additional radial arms are used to support each additional container.

The embodiment of the invention shown in FIGS. 1–8 is one preferred arrangement of the finisher 10. A second embodiment 100 is shown in FIGS. 10–13. In this embodiment, the basic arrangement of the ring supports and containers is the same. One difference is in the configuration of the primary and secondary drive systems.

The primary drive system includes a motor which has an output shaft that includes a primary drive pulley 68 which drives a primary driven pulley 70 with a belt 66. The primary driven pulley 70 is connected to the central shaft 30 in a similar manner as described above for rotationally driving the central shaft 30 and the containers 36.

The secondary drive system in this embodiment is driven directly off of the central shaft 30. The secondary drive system includes a gear train 102 with an input gear 104 mounted to the central shaft for rotating in combination with the central shaft 30, and an output gear 106 mounted to the frame 24 about the central shaft 30 (but free to rotate with respect to the shaft 30). One or more intermediate gears 108 may be engaged with the input and output gears 104, 106 for transmitting the rotation between the two and for providing any necessary gear reduction between the central shaft 30 and the ring support 14. In the illustrated embodiment, there are a total of four intermediate gears 108 used to transmit the rotation. In one arrangement of the illustrated embodiment, the gear ratio provided by the secondary drive system is approximately 1.2:1 (i.e., the outer ring 14/frame structure 24 combination is driven at 1.2 times the speed of the central shaft 30. Various other gearing arrangements can be used depending on the speed reduction desired. In this embodiment, the outer ring 14 on the opposite side of the machine is not driven by the secondary drive system. Instead, it is free wheeling. The wheels drive the outer ring at the appropriate speed.

Although not preferred, it is also possible to eliminate the secondary drive system altogether if desired. In this embodiment, the outer ring would be fixed to the central shaft 30. This embodiment would be more feasible for use in a single container (barrel) embodiment of the machine.

Figure 14:
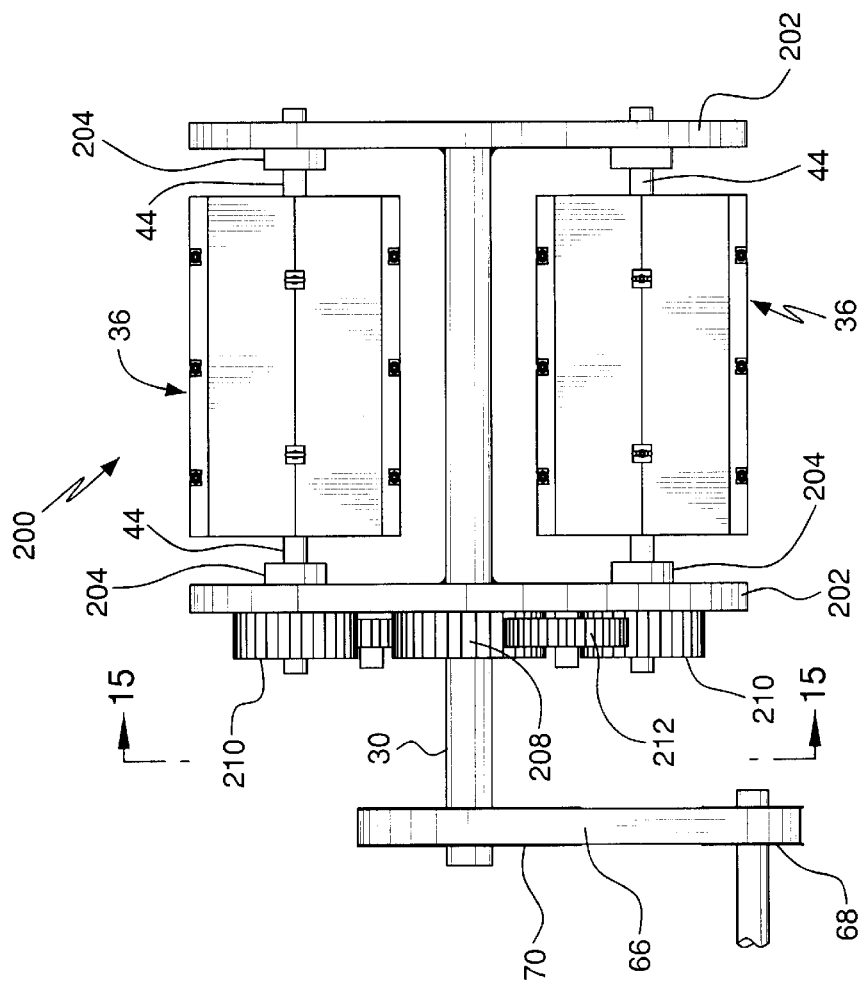
FIG. 14 is a front view of a third embodiment of the invention.
Figure 15:
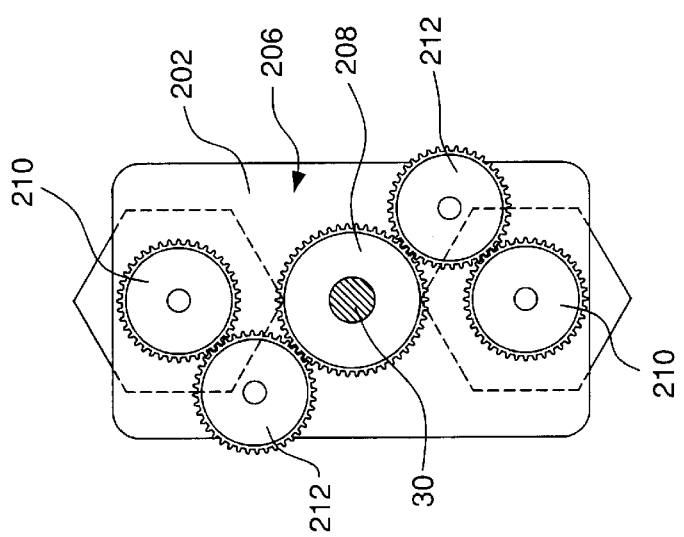
FIG. 15 is a side view taken along lines 15—15 in FIG. 14.

A third embodiment of the invention 200 is shown in FIGS. 14 and 15. In this embodiment, the primary and secondary drive systems are again arranged in a different manner. As with the prior embodiment, the primary drive system includes a motor which rotates a primary drive pulley 68 which is engaged with a primary driven pulley 70 by a belt 66. The primary driven pulley 70 is mounted to the central shaft 30 for rotating it about the horizontal axis 22.

In this embodiment, the radial arm 202 which locates the containers 36 is a plate that is mounted to the central shaft 30. Linear bearings 204 are mounted to the plate near the radially outward ends of the arm 202. As in the above embodiments, the containers 36 include support rods 44. The rods 44 extend through and are supported by the bearings 204, thus allowing the container 36 to rotate about its axis relative to the arms 202. As the arms 202 rotate with the central shaft 30, they cause the containers 36 to rotate about the horizontal axis 22.

The secondary drive system in this embodiment includes a gear train 206. The gear train 206 includes an input gear 208 mounted to the central shaft 30. (In the arrangement shown, the input gear 208 is mounted to the arm 202 which, in turn, is mounted to the shaft 30.) An output gear 210 is attached to the support arm 44 of each container 36 in a conventional manner, such as by means of a key and keyway. The input and output gears 208, 210 may be directly intermeshed or, more preferably, are connected through one or more intermediate gears 212 which are rotatably mounted to the arm 202. The size and number of gears will vary depending on the gear ratio needed between the central shaft and the container.

During operation, as the central shaft rotates, it drives the arms around the horizontal axis 22. At the same time, the input gear 208 will rotate with the central shaft 30. The connection with the input gear 208 causes the output gear 210 to rotate which, in turn, rotates the container 36 about its rotational axis. Thus, the contents within the container are subjected to both rotational and centrifugal motion.

A variation of the prior embodiment is shown in FIGS. 16 and 17. In this variation 300, the support rods 44 extend through the bearings 204 in the fixed radial arm 202. A wheel 220 is fixedly mounted to the rod 44 on the opposite side of the arm 202. The wheel 220 is directly in contact with a cylindrical internal surface of a ring support 222. As with the wheel in the first embodiment, the wheel 220 in this embodiment preferably has a frictional portion which contacts the inner surface of the ring support 222. (Alternatively, the inner surface can have a friction surface formed on it.) The bearing 204 typically permits a small amount (e.g., approximately 3 degrees) of misalignment, thereby accommodating the likely deflections that will occur under high loading conditions.

During operation, as the arm 202 rotates, it rotates the containers 36. The rotation of the containers 36, cause the wheels 220 to begin to roll along the inside surface of the ring support 222, thus causing the container 36 to rotate about its own horizontal axis. Only one ring support 222 is shown in this embodiment, although more may be used. The ring support 222 could also be rotated using a secondary drive system similar to the drive systems described above.

The finishing machines described above are capable of operating at extremely high speed, reaching accelerations of up to 27 g's. These high speeds, as well as the ability to control the rotation of the central shaft and the ring support, provide for efficient processing of a product. The unique horizontal arrangement of the machine also provides increased accessibility to the container for easy removal and placement of products. The horizontal arrangement also provides for complete media coverage within the container. This permits accurate and consistent processing of products from batch to batch.

Another benefit of the present invention is the ability to control agitation of the parts (i.e., the movement of the parts left to right) within the container. The preferred configuration of the machine as described above results in the parts remaining substantially fixed within the container when operated above 5 g's, with no movement caused by the effect of gravity. Thus, the chance of the products being finished becoming damaged from contacting the walls of the container during operation is minimized.

Also, by incorporating the radially displaceable arms into the system, substantially all of the loading caused by the centrifugal and rotational motion is carried by the wheels contacting the outer ring. Thus, the bearing are essentially unloaded. This results in a longer operational life for the machine.

The present invention may be embodied in other specific forms without departing from the spirit or essential attributes thereof and, accordingly, reference should be made to the appended claims, rather than to the foregoing specification, as indicating the scope of the invention.

What is claimed is:

1. A horizontal centrifugal finisher comprising:

first and second outer annular supports, each support having an inner substantially cylindrical surface and a central axis, the first and second supports being spaced horizontally apart from one another with their respective central axes being substantially co-linear with one another so as to define a horizontal axis therebetween;

at least one container having two opposed ends, the container adapted to receive an object to be processed, the container having at least two wheels, each wheel fixedly mounted on one end of the container, the wheels adapted to contact and roll along the inner surfaces of the first and second outer supports, the container having an opening formed in at least one wall of the container, the opening being located between the ends of the container and adapted to permit access to the inside of the container; and a drive system connected to the container for causing the wheels to roll along the inner surfaces of the first and second supports, the rolling of the wheels causing the container to rotate about its axis and the horizontal axis.

2. A horizontal centrifugal finisher according to claim 1, wherein the drive system includes a motor and a central shaft drivingly connected to the motor; wherein there are a plurality of containers mounted between the first and second supports, the central shaft connected to the containers for causing the wheels on the containers to roll along the inner surfaces of the first and second supports; and wherein the first and second supports are substantially cylindrical rings, the first and second rings being supported by the central shaft and adapted to be rotatably driven about their respective central axes.

3. A horizontal centrifugal finisher according to claim 2, wherein the central shaft is located along the central axes of the first and second rings and, wherein the drive system further includes a plurality of timing gears, at least one gear being connected to the first ring, and at least one other gear being connected to the central shaft; the timing gears being intermeshed such that rotation of the central shaft produces rotation of the first ring.

4. A horizontal centrifugal finisher according to claim 3, wherein the connection between the central shaft and each container includes at least one radial support mounted to the central shaft and attached to the container such that rotation of the central shaft causes the radial support to rotate the container about the horizontal axis.

5. A horizontal centrifugal finisher according to claim 4, wherein there are at least two radial supports mounted to the central shaft and attached to each container on opposite sides of the container; and wherein each radial support includes a fixed portion which is attached to the central shaft and a movable portion which is movably attached to the fixed portion and adapted to translate radially outward from the central shaft, the movable portion having a bearing mounted to it, each container having a rod extending laterally outward from each end of the container, the rod being rotatably disposed in and supported by an associated bearing.

6. A horizontal centrifugal finisher according to claim 5, wherein the container includes a top which is movably attached to the container and adapted to seal off the opening in the container during use.

7. A horizontal centrifugal finisher according to claim 4, wherein the motor is connected to the central shaft by a belt drive; and wherein the drive system rotates both the first and second rings about their respective axes.

8. A horizontal centrifugal finisher according to claim 2, wherein the central shaft extends between and lies along the central axes of the first and second rings and, wherein the containers and the first and second rings are connected to the central shaft such that rotation of the central shaft causes the containers and the first and second rings to rotate about the horizontal axis.

9. A horizontal centrifugal finisher according to claim 8, wherein the connection between the first and second rings and the central shaft is through a gear train, and wherein the containers are connected to the central shaft on radially slidable supports.

10. A horizontal centrifugal finisher according to claim 9, wherein each radially slidable support includes a housing fixed to the central shaft and a support shaft mounted in and extending radially outward from the housing, a movable housing including a linear bearing slidingly disposed about the support shaft and a rotary bearing; and wherein each container has a rod extending laterally outward from each end of the container, the rod being rotatably disposed in and supported by the rotary bearing.

11. A horizontal centrifugal finisher according to claim 2, wherein the drive system includes drive shaft connected to the motor, the drive shaft including at least one means for rotationally driving the central shaft, the containers being attached to the central shaft such that rotation of the drive shaft produces rotation of the containers about the horizontal axis, the first and second rings being connected to the drive shaft such that rotation of the drive shaft causes the first and second rings to rotate about the horizontal axis.

12. A horizontal centrifugal finisher according to claim 11, wherein the first and second rings are each connected to the drive shaft by a belt drive, and wherein the containers are connected to the central shaft by radially slidable supports.

13. A horizontal centrifugal finisher according to claim 12, wherein each radially slidable support includes a housing fixed to the central shaft and a support shaft mounted in and extending radially outward from the housing, a movable housing including a linear bearing slidingly disposed about the support shaft and a rotary bearing; and wherein each container has a rod extending laterally outward from each end of the container, the rod being rotatably disposed in and supported by the rotary bearing.

14. A horizontal centrifugal finisher comprising:
a first annular support having a substantially cylindrical inside surface, an outside surface, and a central axis;
a second annular support having a substantially cylindrical inside surface, an outside surface, and a central axis, the second support being horizontally spaced apart from the first support, the axes of the first and second support being substantially co-linear so as to define a horizontal axis therebetween;
a central shaft having a longitudinal axis substantially co-linear with the horizontal axis, the central shaft having at least two radial support arms extending radially outward from the shaft;
at least one container rotatably supported by the radial support arms, the container having two side walls, two end walls, a bottom and an open top, the combination of the walls and the bottom defining an enclosure for containing products to be finished, a cover movably attached to the container for closing off the open top, a wheel fixedly mounted to each end wall outside the enclosure, the container being located between the first and second supports with each wheel adapted to contact and roll along the inside surface of one of the supports; and
a drive system including a motor connected to the central shaft for rotating the shaft and radial arm about the horizontal axis, the rotation of the radial arm causing the wheels to roll around the inside surface of the first and second supports, the rolling of the wheels causing the container to rotate about its rotational axis as it rotates about the horizontal axis.

15. A horizontal centrifugal finisher according to claim 14, wherein there are at least two containers, each container including a support shaft extending horizontally outward from each end wall, and wherein there are at least two radial support arms supporting each container, each radial support arm including a bearing which rotatably receives an associated support shaft.

16. A horizontal centrifugal finisher according to claim 15, wherein each radial support arm includes a fixed portion attached to the central shaft and a slidable portion connected to the support shaft, the connection adapted to permit radially outward movement of the slidable portion during operation of the finisher.

17. A horizontal centrifugal finisher according to claim 16, wherein the drive system includes a transmission connected to the motor and at least the first support, the transmission adapted to transmit rotary motion from the motor to the first support for rotating the support about the horizontal axis.

18. A horizontal centrifugal finisher according to claim 17, wherein the transmission is connected to both the first and second supports for rotating both supports about the horizontal axis.

19. A horizontal centrifugal finisher according to claim 17, further comprising a frame fixedly attached to the first support; and wherein transmission includes a plurality of intermeshed gears, one gear mounted on the central shaft and another gear mounted to the frame.

20. A horizontal centrifugal finisher according to claim 17, further comprising a frame fixedly attached to the first support; and wherein transmission includes a drive shaft engaged with the motor, at least one set of pulleys, the set including a first pulley mounted to the drive shaft and a second pulley mounted to the frame, and a belt disposed about the two pulleys for transmitting rotation from the drive shaft to the frame.

21. A horizontal centrifugal finisher according to claim 20, wherein there is a second frame mounted to the second support; and wherein the transmission includes a second set of pulleys, one pulley of the second set mounted to the drive shaft and the other mounted to the second frame, and a second belt disposed about the second set of pulleys for transmitting rotation from the drive shaft to the second frame.

22. A horizontal centrifugal finisher according to claim 20, wherein the connection between the motor and the central shaft is through a belt drive connecting the drive shaft with the central shaft.

23. A horizontal centrifugal finisher according to claim 17, further comprising a controller for controlling the speed of the first support relative to the containers.

24. A horizontal centrifugal finisher comprising:
a first cylindrical ring support having an inside surface, an outside surface, and a central axis;
a second cylindrical ring support having an inside surface, an outside surface, and a central axis, the second ring being horizontally spaced apart from the first ring, and the central axes of the first and second rings being substantially co-linear so as to define a horizontal axis therebetween;
a central shaft having a longitudinal axis substantially co-linear with the horizontal axis, the central shaft having at least two sets of radial support arms extending radially outward from the shaft;
at least two containers, each container being rotatably supported by a set of radial support arms, the container having two side walls, two end walls, a bottom and an open top, the combination of the walls and the bottom defining an enclosure for containing products to be finished, a cover movably attached to the container for closing off the open top, a wheel fixedly mounted to each end wall of the container outside the enclosure, each container being located between the first and second supports with each wheel adapted to contact and roll along the inside surface of one of the ring supports; and
a drive system including:
a motor connected to the central shaft for rotating the shaft and radial arms about the horizontal axis, the rotation of the radial arm adapted to cause the wheels to roll around the inside surface of the first and second rings, the rolling of the wheels causing the container to rotate about its rotational axis as it rotates about the horizontal axis; and
a secondary drive system connected to the motor and at least the first ring and adapted to rotationally drive the first ring.

25. A horizontal centrifugal finisher comprising:
a cylindrical ring support having an inside surface and a central horizontal axis;
a central shaft having a longitudinal axis substantially co-linear with the horizontal axis of the ring support, the central shaft having at least two radial supports mounted to and extending radially outward from the shaft;
at least two containers, each container being rotatably supported by the radial supports, each container having two side walls, two end walls, a bottom and an open top, the combination of the walls and the bottom defining an enclosure for containing products to be finished, a cover movably attached to the container for closing off the open top, at least one wheel mounted to the container adjacent to one end wall, the wheel on the container being located against and adapted to roll along the inside surface of the ring support; and
a drive system including:
a motor connected to the central shaft for rotating the shaft and radial arms about the horizontal axis, the rotation of the radial arms adapted to cause the wheels to roll around the inside surface of the ring support, the rolling of the wheels causing the containers to rotate about their respective rotational axis as they rotates about the horizontal axis; and
means for rotating the ring support.

26. A horizontal centrifugal finisher comprising:
a main frame;
a central shaft rotationally supported by the main frame, the central shaft having a horizontal longitudinal axis;
at least two radial supports mounted to and extending radially outward from the shaft;
at least two containers, each container being rotatably supported by the radial supports, each container having at least two side walls, two end walls, a bottom and an open top, the combination of the walls and the bottom defining an enclosure for containing products to be finished, a cover movably attached to the container for closing off the open top, each container having a rotational axis; and
a drive system including:
a motor;
a primary drive system connected to the motor and to the central shaft, the primary drive system adapted to rotate the shaft about its horizontal axis; and
a secondary drive system connected to the motor and to the containers and adapted to rotate the containers about their respective longitudinal axis, wherein the secondary drive system is connected to the containers through an outer housing having an inner surface, the containers including a follower mounted to the container which contacts and rolls along the inner surface.

27. A horizontal centrifugal finisher according to claim 26 wherein the secondary drive system is connected to the motor through the central shaft.

* * * * *